United States Patent Office 3,219,128
Patented Nov. 23, 1965

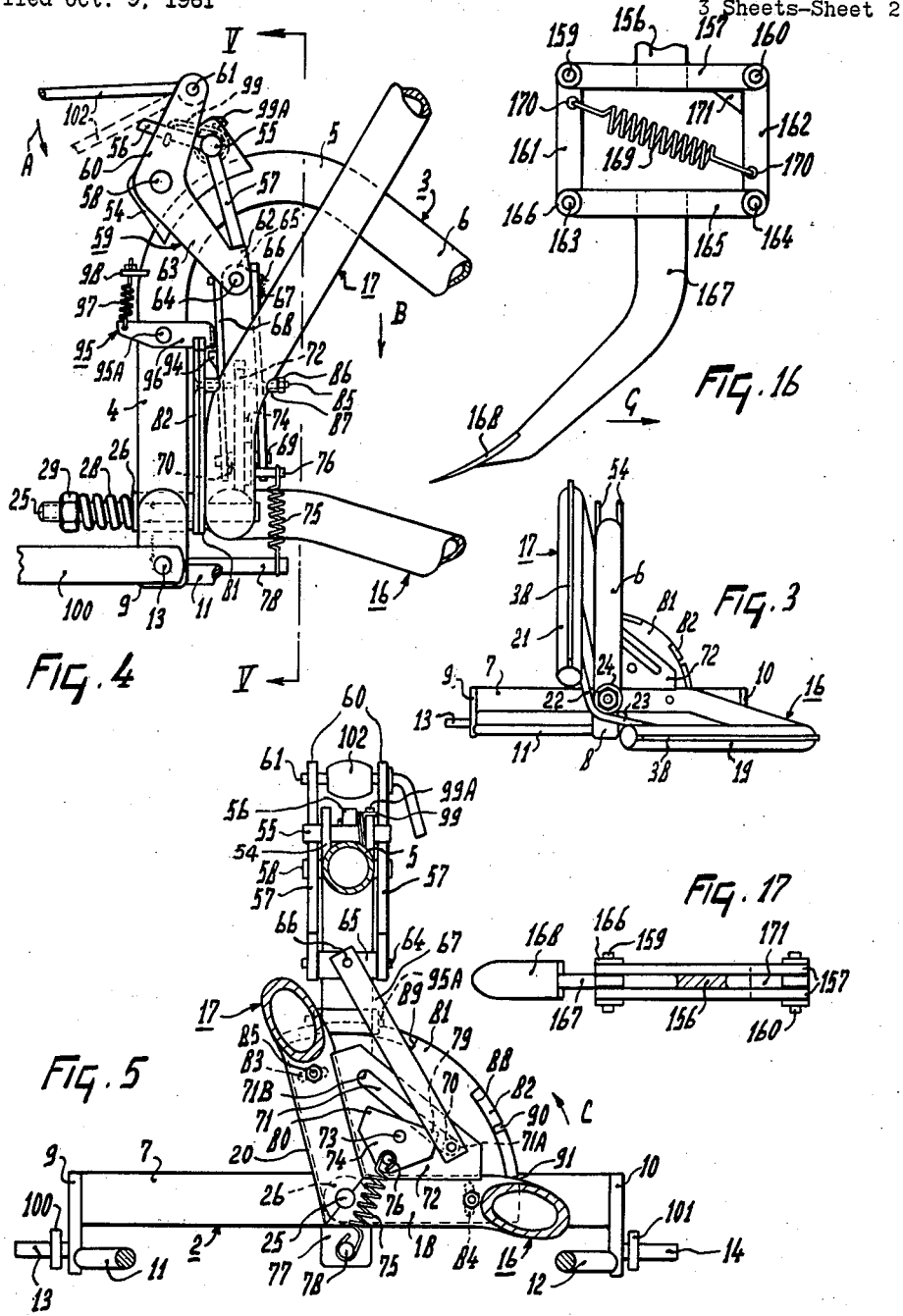

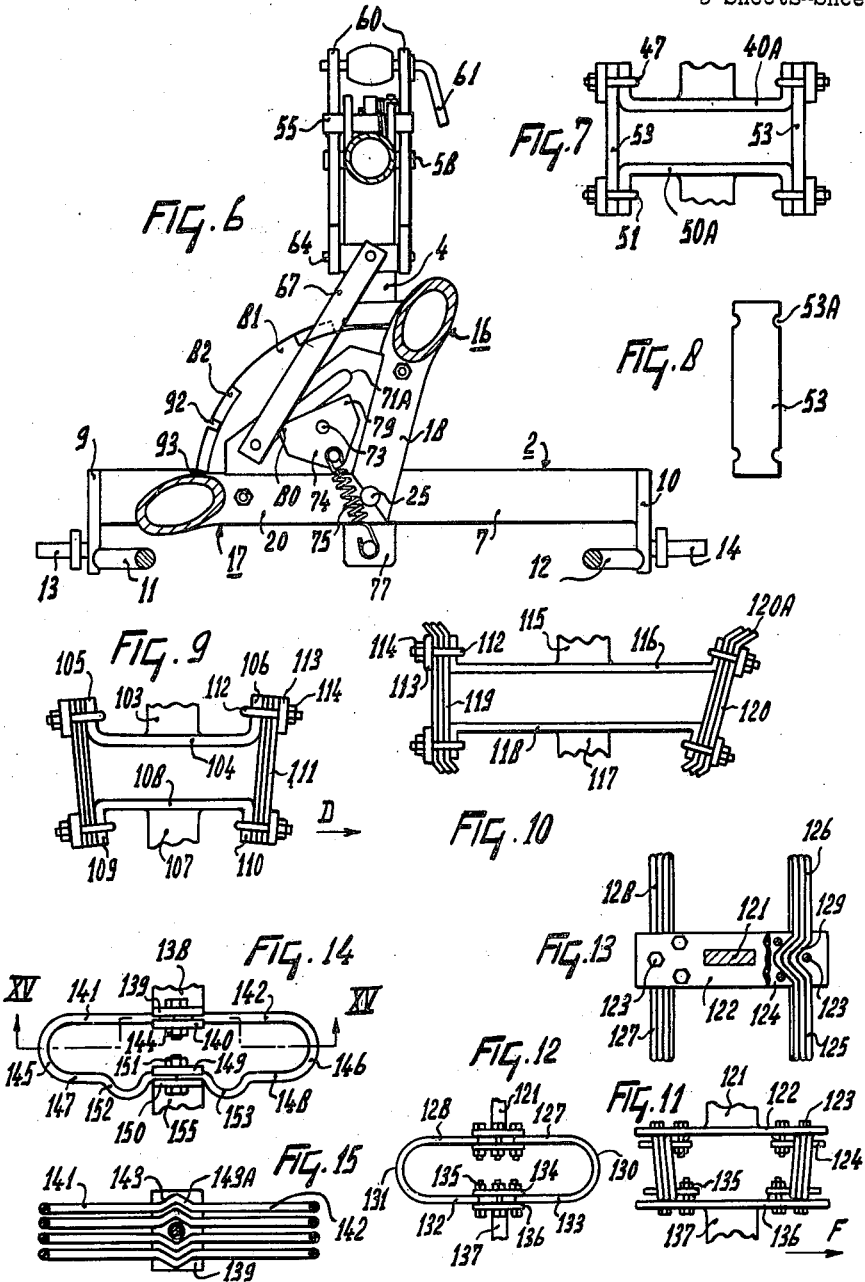

3,219,128
SOIL-TILLING DEVICE, PARTICULARLY
A PLOW
Cornelis van der Lely, Zug, Switzerland, assignor to C. van
der Lely N.V., Maasland, Netherlands, a Dutch limited-
liability company
Filed Oct. 9, 1961, Ser. No. 143,801
Claims priority, application Netherlands, Oct. 10, 1960,
256,711
14 Claims. (Cl. 172—711)

The invention relates to a soil-tilling device, particularly a plow.

According to the invention the device comprises a frame and at least two soil-tilling members, which are coupled with a first frame part, that is rotatable and fixable in at least two positions with respect to a second frame part, the arrangement being such that in a first working position a first soil-tilling member and in a second working position a second-tilling member works the soil, whereas the second frame part is provided with coupling members by means of which the device can be coupled with a prime mover, while the first frame part is coupled viewed in the longitudinal direction of the axis of rotation at two interspaced points with a frame beam, which forms part of the second frame part and is rigidly connected with the further parts of the second frame part.

Thus a satisfactory support of the first frame part in the second frame part can be ensured.

A second aspect of the invention relates to a soil-tilling device, particularly a plow. According to the invention the device comprises a frame and at least two soil-tilling members, which are coupled with a first frame part, which is rotatable and fixable in at least two positions with respect to a second frame part, the arrangement being such that in a first working position a first soil-tilling member and in a second working position a second soil-tilling member works the soil, whereas the first frame part is coupled with the second frame part at two points spaced apart by a given distance, one of these points being located near a frame beam associated with the second frame part and the second point being connected with this frame beam by means of struts.

In this manner a simple and rugged frame can be obtained, in which the rotatable frame part is efficaciously supported.

The invention furthermore relates to a device comprising a frame and soil-tilling members coupled with this frame and capable of working the soil to a given depth below the surface.

In accordance with the invention the soil-tilling members lying in the ground in operation are capable of deflecting resiliently in a direction at least substantially parallel to the travelling direction of the device. In this way an efficient operation of the soil-tilling members in the ground can be obtained.

A fourth aspect of the invention relates to a soil-tilling device comprising a frame, particularly a plow.

In accordance with the invention the device comprises at least two soil-tilling members which are coupled with a first frame part, which is rotatable about an axis of rotation and is fixable in at least two positions relative to a second frame part so that in operation, in a first working position, a first soil-tilling member is adapted to work the soil and in a second working position a further soil-tilling member is adapted to work the soil, while provision is made of a mechanism for turning the first frame part relatively to the second frame part, when the device is lifted by means of the lifting device of a vehicle with which the device is coupled. This mechanism comprises a guide member arranged on the first frame part, which guide member extends obliquely upwards, when one of the soil-tilling members occupies the operational position, and furthermore a member cooperating with the guide member and tending to move upwards during the lift of the device, while the first frame part is provided with a spring-actuated stop, which limits a movement of the said member along the guide so that during the lifting operation the said member turns the stop with the first frame part relatively to the second frame part, the said member co-operating through at least half of the angle through which the first frame part is turned with the stop.

Thus a simple and efficacious mechanism can be obtained for an automatic turn of the frame part with the plow members attached thereto during the lift of the plow.

A fifth aspect of the invention relates to a soil-tilling device, particularly a plow, comprising a frame and at least two soil-tilling members which are coupled with a first frame part, which is rotatable about an axis of rotation and is fixable in at least two positions relative to a second frame part, so that in operation, in a first working position, a first soil-tilling member is adapted to work the soil and in a second working position a second soil-tilling member is adapted to work the soil, provision being made of a blocking member which prevents, in operation, the two frame parts form turning relatively to each other, part of the blocking member turning together with the first frame part, which first frame part is rotatable with respect to the said part of the blocking member and is fixable in a plurality of positions.

In this manner an accurate adjustment of the frame part supporting the soil-tilling members relative to the further part of the frame can be achieved, so that in both working positions the soil-tilling members occupy a suitable position.

For a better understanding of the invention and to show how the same may be carried into effect, reference will now be made to the accompanying drawings.

FIG. 3 is a rear view of the frame of the device shown in FIG. 1.

FIG. 4 is a side elevation of part of the device of FIG. 1 on an enlarged scale, in which the automatic tilting member is shown.

FIG. 5 is a sectional view of the device of FIG. 4, taken in the line V—V.

FIG. 6 is a sectional view of the device of FIG. 4 taken on the line V—V, the rotatable frame part occupying, however, a position differing from that shown in FIGS. 4 and 5.

FIG. 7 shows one embodiment for the fastening of soil-tilling members to the frame.

FIG. 8 shows a spring leaf employed for fastening a soil-tilling member to the frame.

FIG. 9 shows a second embodiment of the fastening of a soil-tilling member to the frame.

FIG. 10 shows a third embodiment of the fastening of a soil-tilling member to the frame.

FIG. 11 shows a fourth embodiment of the fastening of a soil-tilling member to the frame.

FIG. 12 is a side elevation corresponding to FIG. 11.

FIG. 13 is a plan view corresponding to FIG. 12.

FIG. 14 shows a fifth embodiment of the connection of a soil-tilling member with the frame.

FIG. 15 is a sectional view of the fastening of FIG. 14 taken on the line XV—XV, a clamping plate for the fastening of the bars being omitted.

FIG. 16 shows a sixth embodiment of the connection of a soil-tilling member with the frame.

FIG. 17 is a plan view of the fastening shown in FIG. 16.

Figure 1:
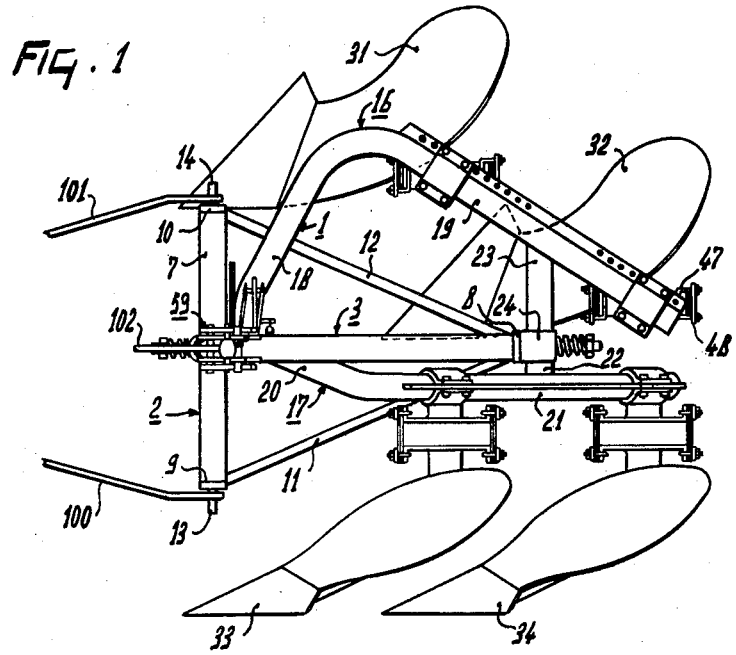
FIG. 1 is a plan view of a soil-tilling device according to the invention, formed by a plow.
Figure 2:
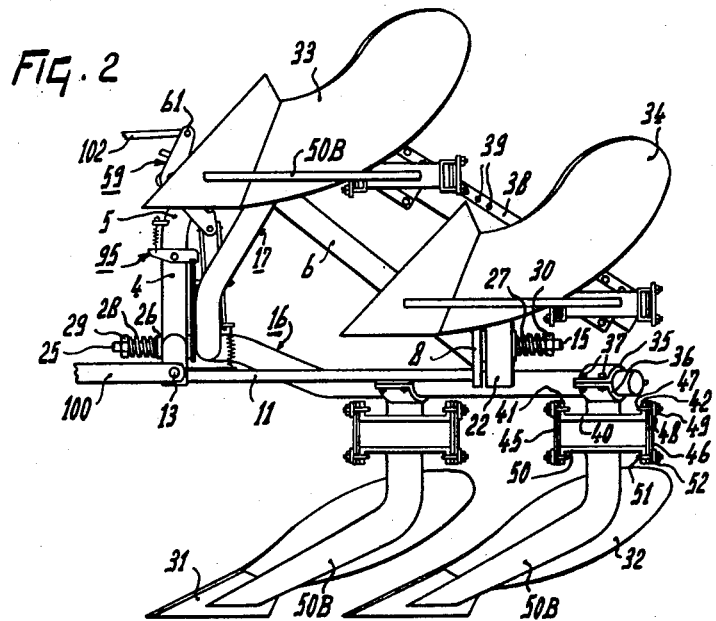
FIG. 2 is side elevation corresponding to FIG. 1.

The frame of the plow shown in FIGS. 1 and 2 comprises a first frame part 1, which is rotatably journalled in a second frame part 2. The frame part 2 comprises a frame beam 3, which consists of a vertically ascending portion 4, a curved portion 5 and a portion 6, connected by the curved portion 5 with the portion 4 and extending obliquely downwards away from the curved portion 5. The frame beam 3 extends parallel to a vertical plane and to the free end of the portion 4 of the frame beam 3 is secured a frame beam 7, which is at right angles to the said plane.

To the end of the portion 6 of the frame beam 3 is secured a vertical plate 8, which extends parallel to the frame beam 7. To the free ends of the beam 7 are fastened plates 9 and 10. Between the plates 9 and 10 and the plate 8 struts 11 and 12 are provided. Viewed from above, the frame beam 7 and the struts 11 and 12 constitute a triangle.

The plates 9 and 10 have furthermore secured to them two aligned pins 13 and 14. To the plate 8 is fastened a shaft 15, which is orthogonal to the beam 7.

The frame part 1 comprises two frame beams 16 and 17, which comprise two portions 18 and 19, 20 and 21 respectively, arranged at an angle to each other. The portions 18 and 20 are secured to each other by their ends and, viewed in a direction parallel to the longitudinal axis of the plow they are at an angle of about 115° (FIG. 6). The portions 19, 21 are bent over so that their free ends are located near each other. The portions 19 and 20 are connected with each other by means of beams 22 and 23, fastened to the said portions and being integral with each other and connected with a bearing 24 (FIG. 3). The bearing 24 accommodates the shaft 15, secured to the frame part 2.

At the point where the portions 18 and 20 of the frame beams 16 and 17 are connected with each other, the frame part 1 has secured to it a shaft 25, which is journalled in a bearing 26, provided in the frame beam 7. The center line of the bearing in the frame beam 7 and the center line of the shaft 15, secured to the plate 8, are in line with each other and coincide with the longitudinal axis of the plow, so that the frame part 1 is capable of turning about an axis of rotation extending in the travelling direction of the plow with respect to the frame part 2.

The shafts 15 and 25 are surrounded by springs 27 and 28, respectively. The spring 28 is enclosed between the bearing 26 and a nut 29, screwed onto the screwthreaded end of the shaft 25. The spring 27 is enclosed between the bearing 24 and a nut 30, screwed onto the screwthreaded end of the shaft 15.

With the portions 19 and 21 of the frame beams 16 and 17 are coupled plow members 31 and 32, 33 and 34, respectively. To this end each plow member is associated with a clamping sleeve consisting of two parts 35 and 36, which sleeve can be clamped tight with the aid of bolts 37 to one of the frame beams. In order to prevent the clamping sleeves from turning around the frame beams, which are circular in this case, each frame beam is provided with a ridge 38, so that the clamping sleeves can be displaced along the frame beam to regulate the distance between the plow members fastened thereto, but not to be turned with respect to the frame beams. The bolts 37 are taken through holes 39 provided in the ridge 38, so that in operation the plow members cannot be displaced along the frame beam.

To each clamping sleeve is fastened a bracket 40, the bent-over ends 41 and 42 of which extend parallel to each other. To these ends are fastened spring plates 45 and 46, respectively, by means of spring straps 47 and clamping plates 48. The ends of the spring plates 45 and 46 are enclosed between the ends 41 and 42, respectively, of the bracket 40 and a clamping plate 48 and are clamped tight with the aid of nuts 49 screwed onto the screwthreaded ends of the strap 47 between the bent-over ends of the bracket 40 and the clamping plate 48. The other ends of the spring plates are clamped tight in a similar manner to a bracket 50 by means of spring straps 51 and clamping plates 53. The plow member is fastened to the bracket 50 with the aid of a supporting arm 50B. The fastening of the spring plates is shown in detail in FIGURES 7 and 8, in which, however, only one spring plate 53 is shown on either side of the bracket instead of two, as in the embodiment shown in FIGS. 1 and 2. Moreover, the distance between the spring plates is smaller in this case.

From FIG. 8 it will be seen that the spring plates are provided with recesses 53A. Similar recesses are provided in the bent-over ends of the brackets 40A and 50A. These recesses accommodate the parallel limbs of the spring straps 47 and 51, so that the spring plates are secured against displacement with respect to the brackets.

To the bent-over part 5 of the frame beam 3 are secured two supports 54, spaced apart from each other by a given distance (FIG. 4). In these supports is journalled a shaft 55, extending parallel to the frame beam 7. To this shaft is secured an arm 56, which is arranged between the supports 54 and to the ends of the shaft 55, projecting beyond the supports 54, arms 57 are secured.

The supports 54 furthermore accommodate a second shaft 58, which is parallel to the shaft 55. To the ends of the shaft 58 lying beyond the supports 54 bell crank levers 59 are secured. The arms 60 of the bell crank levers 59 have holes, through which a pin 61 can be taken. The arms 57, in the position of the device shown in the figure, bear on lugs 62, secured to arms 63 of the bell crank levers. The arms 63 of the bell crank levers 59 have furthermore holes in which a shaft 64 is journalled, which extends parallel to the shaft 58. The shaft 64 is taken through a hole in a block 65, arranged between the bell crank levers 59, so that the block 65 is adapted to turn about the shaft. With the aid of gudgeons 66, secured to the block 65, two bars 67 and 68 are connected with the block 65, so that they can pivot relatively to the block around the gudgeons 66, the center line of which is orthogonal to the center line of the shaft 64. The free ends of the bars 67 and 68 are connected with each other by a pin 69. The pin 69 is surrounded by a sleeve 70, which is accommodated in an elongated slot 71, provided in a plate 72, arranged between the ends of the portions 18 and 20 of the frame beams 16 and 17. The elongated slot 71, which extends obliquely upwards in the position of the first frame part in which one of the plow members occupies a position suitable for working the soil, constitutes a guide for the member associated with this guide member and shaped in the form of the sleeve 70.

With the aid of a gudgeon 73 the plate 72 has secured to it a plate 74 so that the latter is pivotable. With the plate 74 is coupled the end of a spring 75 with the aid of a pin 76, the other end of the spring being secured to a bar 78, arranged on a support 77, secured to the frame beam 7. The center line of the bar 78 is located perpendicularly below the center line of the bearing 26 in the frame beam 7.

The angular points 79 and 80 of the plate 74 located symmetrically to the gudgeon 73 constitute stops cooperating with the sleeve 70. The operation of the mechanism will be described more fully hereinafter.

To the frame beam portions 18 and 20 is secured a sector-shaped plate 81. A similarly shaped sector-like plate 82 bears on the plate 81 and is adapted to turn about the shaft 25. The sector-shaped plate 82 has slots 83 and 84. The sector-shaped plate 82 can be clamped tight against the plate 81 by means of bolts 85 and nuts 86. The bolts 85 are taken through the slots 83 and 84 in the plate 82, through holes in the plate 81 and through sleeves 87 in the beam portions 18 and 20. It will be evident that the plate 82 can be fixed in different positions relative to the beam portions 18 and 20 to the first frame part, since the bolts 85 are taken through the elongated slots 83, 84 in the plate 82.

The periphery of the plate 81 is provided with two elongated recesses 88 and 89. The periphery of the plate 82 has a group of notches 90 and 91 and a group of notches 92 and 93. The two groups are shifted relatively to each other through an angle of about 75° on the periphery of the plate 82 (FIGS. 5 and 6). With the plate 82 cooperates a bracket 95, which is hinged to the frame beam 4 with the aid of a shaft 95A. The limbs 96 of the bracket 95 are spaced apart from each other by such a distance that they can be inserted into the notches 90 and 91 or into the notches 92 and 93. The bracket 95 and the plates 81 and 82 form part of a blocking member, by means of which the first frame part can be fixed with respect to the second frame part, since when the limbs 96 of the bracket are arranged in one of the groups of notches, the two frame parts can no longer turn relatively to each other about the shafts 15 and 25. Since the recesses 88 and 89 of the plate 81 extend over a considerable part of the periphery, the limbs 96 of the bracket 95 can be inserted into the notches of the plate 82 in any position in which the plates 81 and 82 can be clamped to each other. A spring 97, one end of which is coupled with the bracket 95 and the other end of which is coupled with a support 98, secured to the frame part 3, urges the bracket 95 against the plate 81. To the bar 68 is furthermore secured a lug 94, which is located below the bracket 95.

The shaft 55 is surrounded by a helical spring 99. One end of the helical spring is bent around one of the plates 54 and is held in place by means of a lug 99A secured to the plate concerned. The other end of the spring is wound around the arm 56.

As is shown in the figures the plow described above can be coupled with the lifting device of a tractor. To this end the lowermost arms 100 and 101 of the lifting device are coupled with the pins 13 and 14, whereas the topmost arm 102 is coupled by means of the pin 61 with the bell crank levers 59.

In the position shown in FIGS. 1 and 2 the plow members 31 and 32 work the ground, when the device is operative. Owing to the resilient links between the frame, the plow members and the frame parts 1 and 2, the plow members are capable of deflecting parallel to the travelling direction, during which deflection they move at least approximately parallel to themselves. The springs 27 and 28 are then compressed. The resilient movement of the first frame part relative to the second frame part is limited in that the turns of the spring come into contact with each other, so that the spring itself constitutes a stop, which limits the movement of the second frame part. By turning the nuts 29 and 30 the pretension of the springs 27 and 28 can be adjusted. When the spring plates 45 and 46 are bent over, the plow will move slightly upwards.

At the end of the field the plow can be lifted out of the soil by means of the lifting device. During this lifting operation the topmost arm 102 of the lifting device arrives at a given instant into the position shown in broken lines in FIG. 4 relative to the plow and then comes into contact with the arm 56, connected with the shaft 55. When lifting is continued, this arm is turned against the pressure of the spring 99 in the direction of the arrow A. Thus also the arms 57 are turned, so that they are released from the lugs 62, secured to the bell crank levers 59. Under the action of the weight of the plow, this plow will turn about the center lines of the pins 13 and 14 in the direction of the arrow B. Thus the bell crank levers 59 also turn in the direction of the arrow A with respect to the frame part 2 of the plow. The bar 68 thus moves upwards, so that the lug 94 comes into contact with the bracket 95, which is consequently turned about the shaft 95A so that the limbs of the bracket are pushed out of the notches of the sector-shaped plate 82.

Then the frame part 1 is freely rotatable with respect to the frame part 2 of the plow. Since the shaft 64 has been moved upwards during the turn of the bracket 95 with the aid of the lug 94, the sleeve 70 has been displaced over a given distance in the elongated slot 71. At the instant the limbs 96 of the bracket 95 are completely removed from the notches of the plate 82, the sleeve 70 comes into contact with an angular point 79 of the plate 74. The frame will turn on around the pins 13 and 14 so that also the bell crank levers 59 continue turning and the shaft 64 moves further upwards with respect to the shaft 25. The sleeve 70, connected with the shaft 64, will thus also move further upwards. Since the sleeve 70 bears on the plate 74, the sleeve 70 will carry along the plate 74 during its further movement, so that the frame part 1 is turned about the shafts 15 and 25 with respect to the frame part 2 in the direction of the arrow C (FIG. 5).

In the position of the frame part 1, in which the elongated slot 71 is horizontal, the bars 67 and 68 still occupy a slightly oblique position, and the sleeve 70 still bears on the plate 74. The shaft 64 will continue its upward movement, the bars 67 and 68 then arriving in a perpendicular position. In this position the point of gravity of the frame part 1 has passed by the axis of rotation of the frame part 1, formed by the center lines of the shafts 15 and 25, so that the frame part 1 turns on in the direction of the arrow C under the action of its own weight. The sleeve 70 again moves towards the end 71A of the slot, while under the action of the force exerted by the spring 75 the plate 74 occupies the position shown in FIG. 6.

When subsequently the plow is lowered with the aid of the lifting device, the plow members 33 and 34 come into contact with the soil. When the lifting device continues this lowering movement, the plow turns around the pins 13 and 14 in the direction opposite the arrow B. The sleeve 70 moves towards the end 71B of the slot 71 and the bars 67 and 68 of the reversing mechanism arrive into the position shown in FIG. 6. During the movement of the sleeve 70 in the slot 71 the plate 74 is turned by the sleeve 70 to allow the latter to pass. The plate 74 then returns into the position shown in FIG. 6 under the action of the spring 75. The bracket 95 returns into the position shown in FIG. 4 and then bears in the notches 90 and 91 in the plate 82. Also the further parts of the reversing mechanism, for example the bell crank levers and the arms 56 and 57 return automatically into the position shown in FIG. 4 during the lowering movement of the lifting device, so that finally the frame parts 1 and 2 are again locked relatively to each other in the position shown in FIG. 6 and the plow is again ready for use.

The rotatable frame part is efficaciously supported in the further part of the frame, since it is journalled in the further frame part at two points spaced apart from each other by a given distance. The shape of the frame part accommodating the rotatable frame part is such that it constitutes a rigid unit so that undesirable deformations are not likely to occur.

An efficient construction of the frame is obtained, when the distance between the points where the first frame part is supported by the second frame part is equal to or larger than the distance between the coupling points of the lowermost arms of the lifting device to the frame.

Since the frame part supporting the soil-tilling members is adjustable and fixable in a plurality of positions with respect to the blocking member of which the sector-shaped plate 82 and the bracket 95 form part, an accurate adjustment of the said frame part can be obtained so that in both working positions the soil-tilling members are in a favorable position.

From FIG. 2 it is furthermore evident that the beam to which the plow members are secured, which are operative during the travel of the device, is located below the rotary axis of the first frame part and approximately at the height of the struts.

FIG. 9 shows a second embodiment of the resilient fastening of a soil-tilling member, for example a plow member, to the frame of the plow. To this end the frame beam 103 of the frame has secured to it a horizontal bracket 104, the ends 105 and 106 of which are obliquely bent upwards. The plow body is secured to a supporting arm 107, to the end of which is secured a horizontal bracket 108, the ends 109 and 110 of which are obliquely bent over downwards. The ends 105 and 106 of the bracket 104 and the ends 109 and 110 of the bracket 108 are connected with each other by means of spring plates 111, which are clamped tight to the bent-over ends by means of spring straps 112, clamping plates 113 and nuts 114.

From the figure it will be seen that the spring leaves are not in a vertical position, but they are at an angle to the vertical so that they are orientated obliquely in opposite directions, whereby imaginary lines extending from the spring leaves intersect each other below the brackets 104 and 108. It is thus ensured that, when the plow body fastened to the beam 107 deflects in the direction of the arrow D under the action of the forces exerted thereon, the plow member so to say tilts to some extent about an imaginary axis extending transversely to the travelling direction, so that the front side of the plow body turns upwards.

In order to fix the spring plates recesses may be provided, in the manner illustrated in FIGS. 7 and 8, in the sides of the spring plates and the ends of the brackets for accommodating the limbs of the spring straps.

A third embodiment of the fastening of a plow body to the frame is shown in FIG. 10. The frame beam 115 of the frame has secured to it a bracket 116 and the supporting arm 117, with which a plow member may be coupled, has secured to it a bracket 118. The brackets 116 and 118 are connected with each other by means of spring plates 119 and 120, which are clamped tight to the bent-over ends of the brackets 116 and 118 with the aid of spring straps, clamping plates and nuts. The last-mentioned parts are designated by the same reference numerals as in the preceding embodiment.

From FIG. 10 it appears that the foremost spring plates extend parallel to a vertical plane, whereas the hindmost spring plates are at an angle to the vertical so that the lowermost points of the spring plates, viewed in the travelling direction of the plow are located further to the front, in operation, than the topmost points of the spring plates. The ends 120A of the spring plates are bent over so that a displacement of the spring plates is avoided. It is only desirable to provide recesses in the sides of the bent-over ends of the brackets 116 and 118 for accommodating the parallel limbs of the spring straps, while no recesses need be provided in the spring plates as in the embodiment shown in FIGS. 7 and 8.

Also in this case, when in operation the plow moves to the rear, the plow member will tilt to some extent about an axis transverse to the travelling direction. The extent of the rearward movement of the plow can be controlled by varying the number of spring plates arranged between the brackets.

From the figures it will furthermore be seen that the distance between the foremost and the hindmost spring plates is usually greater than the free length of the spring plates arranged between the brackets and the long side of the rectangle forming the sectional area of a spring plate is at least substantially perpendicular to the travelling direction.

FIGS. 11 to 13 show a fourth embodiment of the fastening of a soil-tilling member to the frame. The frame beam 121 has secured to it a plate 122, to which are secured with the aid of bolts 123, and clamping plates 124, spring steel bars 125, 126, 127 and 128. The ends of the aligned bars 125 and 126 and of the aligned bars 127 and 128 are bent over and connected with each other by curved portions 129, formed by the ends.

From FIG. 13 it is evident that the curved portions 129 are enclosed between the bolts 123, lying on both sides of the curved portions, so that a displacement of the bars with respect to the plate 122 is avoided. The bars 127 and 128 are connected via curved portions 130 and 131 with spring steel bars 132 and 133. The bars 127 and 128, 132 and 133 of this embodiment have a circular sectional area and are made, together with the curved portions 130 and 131, from one piece of steel wire. The ends of the bars 132 and 133, like the ends of the bars 127 and 128, are bent over and join each other. The bent-over and joined parts of the bars 132 and 133 are clamped tight to a plate 136 by means of a clamping plate 134 and bolts 135. The ends of these bars are similarly enclosed between the bolts 135 as the parts connecting the bars 127 and 128. The bars 125 and 126, like the bars 127 and 128, are connected with bars, which are spaced apart from the bars 132 and 133 by a given distance and clamped tight to a plate 136 also by means of a clamping plate 134 and bolts 135.

The plate 136 has secured to it a supporting arm 137, with which a plow member or a different soil-tilling member can be coupled. The bars are arranged so that in operation they are at right angles to the travelling direction of the soil-tilling member. In this manner the soil-tilling member coupled with the arm 137 is capable of deflecting resiliently at least substantially parallel to the travelling direction, the bars being then under strain of torsional stress.

From the figures it will furthermore be seen that the bars, for example 132 and 133 which are connected with the soil-tilling member, are located below the bars 125 to 128, secured to the frame, whereas the bars secured to the soil-tilling member are nearer each other than the bars secured to the frame. Consequently, when the soil-tilling member deflects in the direction of the arrow F under the action of the forces exerted on the soil-tilling member, this member will also turn to some extent about an axis extending transversely to the travelling direction, while the front side of the soil-tilling member moves upwards. The distance between the groups of bars is larger than the free length of one bar and also the distance between two interconnected bars is smaller than the free length of one bar. It will be obvious that the number of adjacent bars in one group which number amounts to three in the embodiment shown, may be modified as well as the number of groups connecting the soil-tilling member with the frame. In certain cases it will even be possible to employ only one group of bars.

FIGS. 14 and 15 show a fifth embodiment of the resilient fastening of a soil-tilling member to the frame of a device. In this embodiment a frame beam 138 has secured to it a plate 139. Between this plate 139 and a plate 140 are accommodated the ends of aligned, spring steel bars 141 and 142. The ends 143 and 143A of the bars 141 and 142, respectively, are bent over and connected with each other. The plates 139 and 140 are clamped tight against the bars with the aid of a bolt 144, which is located between the bent-over ends of the bars. Thus a displacement of the bars is avoided. If desired, the plates 139 and 140 may be provided with lugs to avoid a displacement of the bars.

The bars 141 and 142 are connected via curved portions 145 and 146 with bars 147 and 148, extending parallel to the bars 141 and 142. The ends of these bars are located between two plates 149 and 150, which are connected with each other by means of a bolt 151. The ends of the bars 147 and 148 are capable of turning freely about their longitudinal axes between the plates 149 and 150. The bars 147 and 148 have, near the plates, curved portions 152 and 153, respectively, so that the plate 150 cannot shift in place with respect to the bars in a direction parallel to the longitudinal direction of the bars. To the plate 150 is secured a supporting arm 155, with which a soil-tilling member, for example a plow member can be coupled. In the manner described with reference to the preceding embodiment a number of groups of torsional bars can be provided also in this case between the frame and the soil-tilling member.

FIGS. 16 and 17 show a sixth embodiment of the resilient connection of a soil-tilling member with the frame. In this embodiment the frame beam 156 has secured to it bars 157. The ends thereof have holes for accommodating shafts 159 and 160. With the aid of these shafts arms 161 and 162 are hinged to the supports 157. With the aid of shafts 163 and 164 the ends of the arms 161 and 162 have secured to them two parallel supports 165. The shafts 159 and 160, 163 and 164, which are located at the angular points of a parallelogram, are held in place by means of rings 166 provided on the shafts and located each on one side of the supports 157 and 165. To the supports 165 is fastened a soil-tilling member formed by a cultivator tine. To the end of the cultivator tine 167 is secured a blade 168. Between the arms 161 and 162 provision is made of a spring 169 the ends of which are hooked into holes 170 provided in the arms. The support 157 has furthermore secured to it a stop 171, which limits at least in one direction a turn of the arms 161 and 162 under the action of the spring mechanism formed by the spring 169.

In operation the cultivator tine tends, to move under the action of the forces exerted thereon, in the direction of the arrow G. This movement is counteracted by the spring 169. Consequently, in operation the tine is capable of deflecting resiliently.

It will be obvious that other soil-tilling members can be resiliently coupled with the frame instead of plow members or cultivator tines in the structure of the preceding embodiments.

The resilient deflectability of the soil-tilling members may have a favorable effect. For example the value of the forces exerted on the soil-tilling member will often vary, so that under the action of the spring mechanism the soil-tilling members are capable of performing a reciprocating motion, which may be advantageous in certain conditions.

If the operative face of the plow members is provided with a chromium layer, a very smooth surface of high resistance to wear can be obtained.

What I claim is:

1. A plow comprising a plow beam having a downwardly extending portion, at least one plow member supported by a downwardly extending supporting arm, spring means connecting said portion to said supporting arm, said spring means being a pair of spaced resilient members extending in the same general direction as said portion and said supporting arm, said resilient members being joined to said portion and said arm by substantially horizontal and substantially parallel parts, said spring means being the sole connection between the said portion and said supporting arm, said resilient members being is capable of performing a permanent movement in a direction at least substantially parallel to the direction of travel of the said plow member.

2. The structure of claim 1 wherein said spring means includes a plurality of spring plates.

3. The structure of claim 2 wherein said spring plates are mounted in brackets in a position parallel to each other.

4. The structure of claim 2 wherein said spring plates are provided with bent over ends.

5. The structure of claim 2 wherein some of the said spring plates are spaced from others of said spring plates.

6. The structure of claim 5 wherein said spring plates are mounted in said brackets in parallel relation to each other.

7. The structure of claim 5 wherein some of the said spring plates are spaced from others of said spring plates, said last named spring plates extending in non-parallel relationship to said spring plates first named.

8. The structure of claim 1 wherein said spring means comprises spaced brackets, spring plates and means for connecting said spring plates to said brackets.

9. The structure of claim 8 wherein said brackets are provided with turned over ends.

10. The structure of claim 8 wherein said plates are in spaced parallel relation to each other, said plates engaging the turned over ends of said brackets.

11. The structure of claim 8 wherein said spring plates lie in parallel relation to each other.

12. The structure of claim 8 wherein said means for connecting said spring plates to said brackets include a plurality of spring stops.

13. The structure of claim 12 wherein said spring plates are provided with recesses for holding said spring stops in position against said brackets.

14. The structure of claim 13 wherein said brackets are also provided with recesses for holding said spring stops in position.

References Cited by the Examiner

UNITED STATES PATENTS

| | | | |
|---|---|---|---|
| 1,108,174 | 8/1914 | Hollingsworth | 172—224 |
| 1,348,995 | 8/1920 | Himes | 172—709 X |
| 1,410,917 | 3/1922 | Hee | 172—227 |
| 1,636,048 | 7/1927 | Drefke | 172—708 |
| 1,992,313 | 2/1935 | Langley | 172—708 |
| 2,017,873 | 10/1935 | Strandlund | 172—227 X |
| 2,320,742 | 6/1943 | Newkirk | 172—705 X |
| 2,439,921 | 4/1948 | Brown | 172—705 |
| 2,663,973 | 12/1953 | White | 47—1 |
| 2,712,276 | 7/1955 | Cahow | 172—210 |
| 2,772,615 | 12/1956 | Smith | 172—161 |
| 2,777,373 | 1/1957 | Pursche | 172—227 X |
| 2,853,930 | 9/1958 | Parks | 172—462 X |
| 2,900,032 | 8/1959 | Mellen | 172—210 |
| 2,913,059 | 11/1959 | Toland | 172—224 |
| 2,963,097 | 12/1960 | Silver | 172—210 |
| 2,982,362 | 5/1961 | Thompson | 172—210 |

FOREIGN PATENTS

| | | |
|---|---|---|
| 3,778 | 1926 | Australia. |
| 66,122 | 8/1914 | Austria. |
| 493,615 | 2/1950 | Belgium. |
| 58,663 | 9/1891 | Germany. |
| 304,070 | 2/1918 | Germany. |
| 327,751 | 10/1920 | Germany. |
| 820,344 | 11/1951 | Germany. |
| 519,046 | 3/1940 | Great Britain. |
| 814,105 | 5/1959 | Great Britain. |

OTHER REFERENCES

Marty, German application 1,070,866, printed Dec. 10, 1959 (Klasse 45 A5/14); 4 sheets dwg., 5 pages spec. Only sheet 4 of the drawing is relied on.

ABRAHAM G. STONE, *Primary Examiner.*

A. JOSEPH GOLDBERG, T. GRAHAM CRAVER,
*Examiners.*